United States Patent Office 2,768,193
Patented Oct. 23, 1956

2,768,193
ORGANOSILICON COMPOUNDS CONTAINING PHOSPHORUS

Alfred R. Gilbert, Schenectady, N. Y., assignor to General Electric Company, a corporation of New York No Drawing. Application February 23, 1954, Serial No. 412,120

15 Claims. (Cl. 260—448.2)

This invention relates to organosilicon compounds containing phosphorus attached to silicon through aliphatic carbon. More particularly, this invention is concerned with the product of reaction between (1) an organosilicon compound containing a haloalkyl radical attached to silicon and (2) an ester of an acid of trivalent phosphorus. This invention is also concerned with the process of forming the phosphorus-containing organosilicon compounds described.

I have discovered that when an organosilicon compound containing a haloalkyl radical attached to silicon is reacted with an ester of an acid of trivalent phosphorus, an organosilicon compound is formed which contains phosphorus attached to silicon through aliphatic carbon. This reaction takes place with the oxidation of the phosphorus to its pentavalent state, with the substitution of phosphorus for the halogen atom of the haloalkyl radical, and with the formation of a hydrocarbon halide.

The compounds of the present invention have properties which are distinctively different from the properties of organosilicon compounds containing alkyl radicals only, or chloroalkyl radicals only, attached to silicon. Because the phosphorus compounds which are added to the organosilicon compound are polar in nature, the solubility of the organosilicon compounds is greatly affected. For example, the phosphorus-containing organosilicon compounds have only limited solubility in methylsilicones and hydrocarbon solvents. The phosphorus-containing compounds have also been found to have excellent flame-retardant properties. The fact that many of the compounds of the present invention will not burn even in a burner flame is unexpected since both the lower molecular weight chloroalkyl organosilicon compounds and the lower esters of acids of trivalent phosphorus are inflammable.

The organosilicon materials used in the practice of the present invention are organosilicon compounds containing the

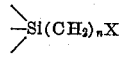

grouping, where X is halogen, e. g., chlorine, bromine, etc., and $n$ is an integer equal to from 1 to 10, inclusive, and preferably is equal to from 1 to 6, inclusive. Organosilicon compounds containing the

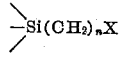

grouping will be referred to hereinafter as "haloalkyl silicon compounds." The —$(CH_2)_nX$ radical will be referred to hereinafter as the "haloalkyl radical." Haloalkyl silicon compounds which are used in the practice of the present invention include, for example, haloalkyl silanes having the general formula:

(1) 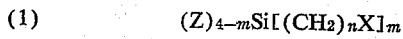

where Z represents monovalent hydrocarbon radicals and mixtures of hydrocarbon radicals, for example, alkyl radicals, e. g., methyl, ethyl, propyl, butyl, octyl, etc., radicals; aryl radicals, e. g., phenyl, diphenyl, naphthyl, etc., radicals; halogenated aryl radicals, e. g., chlorophenyl, dichlorophenyl, pentachlorophenyl, etc., radicals; alkaryl radicals, e. g., tolyl, xylyl, etc., radicals; aralkyl radicals, e. g., benzyl, phenylethyl, etc., radicals; $m$ is an integer equal to from 1 to 4, inclusive; and X and $n$ are as defined above. Where 4—$m$ is greater than 1, the Z radicals may be different radicals. Examples of haloalkyl silanes within the scope of the present invention include, for example, chloromethyltrimethylsilane, bis-(chloromethyl)-dimethylsilane, chloromethylpentamethyldisilane, chloroethyltriethylsilane, bromomethyltrimethylsilane, iodoethyltriethylsilane, etc.

The haloalkyl silicon compounds used as starting materials in the present invention also include both linear and cyclic organopolysiloxanes containing the structural unit (2) 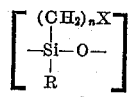

either recurring by itself or intercondensed with other siloxane units of the structure (3) 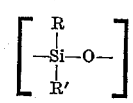

where R and R' are monovalent hydrocarbon radicals of the same scope as Z, and X and $n$ are as defined above. Examples of such compounds include linear haloalkylpolysiloxanes, e. g., chloromethylpentamethyldisiloxane, chloroethylpentaethyldisiloxane, bromomethylpentamethyldisiloxane, chloromethylheptamethyltrisiloxane, etc.; haloalkylcyclopolysiloxanes, e. g., chloromethylheptamethylcyclotetrasiloxane, chloroethylpentaethylcyclotrisiloxane, bromomethylheptamethylcyclotetrasiloxane, etc.; and higher alkyl and aryl chain-stopped silicone oils containing at least one haloalkyl radical attached to silicon.

The haloalkyl silicon compounds used for the present invention are well known to the art. Many of the haloalkylsilanes and their methods of preparation are described in the following patents: 2,511,812, Goodwin, Jr.; 2,582,568, Speier, Jr.; 2,582,569, Speier, Jr.; 2,589,445, Sommer; 2,589,446, Sommer; 2,590,957, Goodwin, Jr.; 2,607,791, Goodwin, Jr.; and 2,610,198, Sommer. Many of the haloalkylpolysiloxanes are described in the following patents: 2,407,181, Scott; 2,435,148, McGregor et al.; 2,439,669, Nordlander; 2,444,858, Speier, Jr.; 2,452,895, Bluestein; 2,457,539, Elliott et al.; 2,491,833, Sauer; 2,507,519, Goodwin, Jr.; 2,513,924, Elliott et al.; and 2,522,053, McGregor et al.

In general, these haloalkylsilicon compounds may be prepared by passing a halogen gas or vapor through an alkylsilicon compound until the desired degree of halogenation is obtained. In the practice of the present invention it is preferred to have not more than one halogen atom attached to each alkyl radical. However, the reaction of the present invention will take place when more than one halogen is present per alkyl radical. It is also preferred to have only one haloalkyl radical per silicon atom, even though the reaction will proceed when a silicon atom contains more than one haloalkyl radical.

The esters of acids of trivalent phosphorus used in the present invention include esters of the formulas:

(4) 
(5) 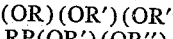
(6) 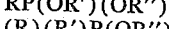

where R and R' are as defined above and R" has the same meaning as R and R'. Because of the lack of agreement in the nomenclature of esters of acids of phosphorus, chemical symbols will be used to describe all of these esters except those whose nomenclature is well established. Examples of esters of acids of trivalent phosphorus which may be used in the practice of the present invention include, for example, trimethylphosphite, $P(OCH_3)_3$; triethylphosphite, $P(OC_2H_5)_3$; triisopropylphosphite, $P[OCH(CH_3)_2]_3$; tributylphosphite, $P(OC_4H_9)_3$; trioctylphosphite, $P(OC_8H_{17})_3$; triphenylphosphite, $P(OC_6H_5)_3$; tritolylphosphite, $P(OC_6H_4CH_3)_3$; tribenzylphosphite, $P(OCH_2C_6H_5)_3$; methyldiethylphosphite, $P(OCH_3)(OC_2H_5)_2$; methylethylphenylphosphite, $P(OCH_3)(OC_2H_5)(OC_6H_5)$; dimethyl methylphosphonite, $CH_3P(OCH_3)_2$; dimethyl ethylphosphonite, $C_2H_5P(OCH_3)_2$; diethyl methylphosphonite, $$CH_3P(OC_2H_5)_2$$

diphenyl ethylphosphonite, $C_2H_5P(OC_6H_5)_2$; methylphenyl ethylphosphonite, $C_2H_5P(OCH_3)(OC_6H_5)$ $$(CH_3)_2P(OCH_3)$$
$$(C_2H_5)_2P(OC_2H_5)$$
$$(C_6H_5)_2P(OC_6H_5)$$
$$(CH_3)(C_2H_5)P(OC_2H_5)$$
$$(CH_3)(C_2H_5)P(OC_6H_5)$$
$$(CH_3)(C_6H_5)P(OCH_3)$$

etc.

Thio analogues of these esters of acids of trivalent phosphorus may also be used to obtain the analogous thio analogues.

The reactions which take place when the phosphorus compounds of formulas 4 through 6 are reacted with a haloalkyl silicon compound containing the

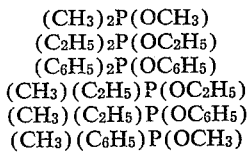

group may be represented by the following equations:

(7)

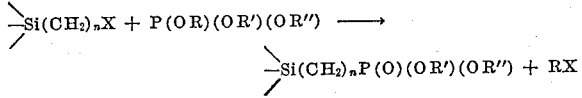

(8)

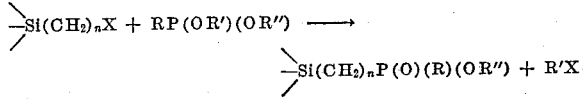

(9)

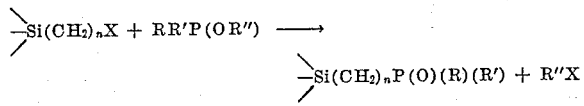

Specific reactions and products within the scope of the present invention include:

$(CH_3)_3SiCH_2Cl + P(OC_2H_5)_3 \longrightarrow$
$\qquad (CH_3)_3SiCH_2P(O)(OC_2H_5)_2 + C_2H_5Cl$ $(CH_3)_3SiOSi(CH_3)_2CH_2Cl + P(OC_2H_5)_3 \longrightarrow$
$\qquad (CH_3)_3SiOSi(CH_3)_2CH_2P(O)(OC_2H_5)_2 + C_2H_5Cl$ $(CH_3)_3SiCH_2Cl + C_2H_5P(OC_2H_5)_2 \longrightarrow$
$\qquad (CH_3)_3SiCH_2P(O)(C_2H_5)(OC_2H_5) + C_2H_5Cl$ $(CH_3)_3SiCH_2Cl + (C_2H_5)_2P(OC_2H_5) \longrightarrow$
$\qquad (CH_3)_3SiCH_2P(O)(C_2H_5)_2 + C_2H_5Cl$

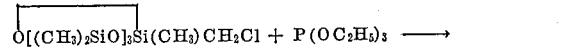

$(CH_3)_3SiCH_2Cl + P(OCH_3)_3 \longrightarrow$
$\qquad (CH_3)_3SiCH_2P(O)(OCH_3)_2 + CH_3Cl$ $(C_2H_5)_3SiC_2H_4Cl + P(OC_4H_9)_3 \longrightarrow$
$\qquad (C_2H_5)_3SiC_2H_4P(O)(OC_4H_9)_2 + C_4H_9Cl$ In general, the reaction of the present invention may be carried out advantageously by merely adding the haloalkyl silicon compound and the ester to a reaction vessel and applying heat. Since a product of the reaction is a relatively volatile hydrocarbon halide, the temperature of the reactants is brought up to the point where the hydrocarbon halides formed will readily volatilize from the mixture. The temperature at which this volatilization occurs will, of course, vary with the reactants. Where the hydrocarbon halide formed is ethyl chloride, it has been found that the temperature of the reaction must be brought up to about 200° before all of the ethyl chloride is removed from the solution. The time of the reaction also varies with the reactants, and it has been found that when ethyl chloride must be evolved, the reaction time may vary anywhere from about one hour to seventy or more hours. Although the proportions of reactants may vary within wide limits, e. g., from about 0.1 to about 10 moles of the haloalkyl silicon compound per mole of the ester of an acid of trivalent phosphorus, we have found it advantageous to use about one mole of the ester per mole of haloalkyl radicals.

The following examples are illustrative of the practice of my invention and are not intended for purposes of limitation.

*Example 1*

A silane was prepared by mixing 61.2 g. (0.5 mole) of chloromethyltrimethylsilane with 78.9 g. (0.475 mole) of triethyl phosphite and heating the mixture to a reflux temperature of about 100° C. Volatile products from the reaction were collected in a liquid nitrogen trap. The reactants were heated for a period of 68½ hours during which time the temperature of the liquid in the flask rose from 100° C. to 185° C. At the end of this time 24.2 g. of ethyl chloride had been condensed in the liquid nitrogen trap. Vacuum distillation of the residue in the flask (107 g.) yielded 63.3 g. of $$(CH_3)_3SiCH_2P(O)(OC_2H_5)_2$$

which boiled between 118° C. and 121° C. at 22 mm. The center fraction which boiled at 119° C. at 22 mm. had a refractive index $n_D^{20}$ 1.4321. Chemical analysis of the product showed it to contain 13.6% phosphorus as compared with the theoretical value of 13.8% phosphorus.

*Example 2*

A linear polysiloxane was prepared by adding 49.1 g. (0.25 mole) of chloromethylpentamethyldisiloxane and 41.5 g. (0.25 mole) of triethylphosphite to a flask and heating for sixteen hours. During the heating period the temperature of the liquid in the flask rose to 153° C. before refluxing began and then rose to 200° C. during the course of the reaction. During the sixteen hour reaction period 14.5 g. of a volatile product (ethyl chloride) was collected in a liquid nitrogen trap. Distillation of the reaction mixture yielded 35.6 g. of $$(CH_3)_3SiOSi(CH_3)_2CH_2P(O)(OC_2H_5)_2$$

which boiled between 154° C. at 36 mm. and 157° C. at 33 mm. The center cut of this product boiled at 157° C. at 36 mm. and had a refractive index $n_D^{20}$ 1.4240. Chemical analysis of the product showed it to contain 10.4% phosphorus, which is the theoretical value.

*Example 3*

A cyclic polysiloxane derivative was prepared by adding 82.6 g. of chloromethylheptamethylcyclotetrasiloxane and 41.5 g. of triethylphosphite to a flask and heating for ten and three-quarter hours. The temperature of the solution rose from 172° C. at the beginning of the reaction to 197° C. in one and one-half hours and attained a temperature of 205° C. during the time of heating. At the end of the reaction a total of 17.2 g. of volatile products, mostly ethyl chloride, had been collected in a liquid nitrogen trap. The material in the flask was fractionally distilled to yield 25.5 g. of

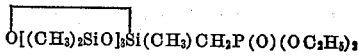

which boiled at 161° C. at 11 mm. and had a refractive index $n_D^{20}$ 1.4212. Chemical analysis of the product showed it to contain 6.9% phosphorus as compared with the theoretical value of 7.2% phosphorus.

*Example 4*

A chloromethyl silicone oil was prepared by mixing 246 g. of chloromethylheptamethylcyclotetrasiloxane with 10 g. of hexamethyldisiloxane and 10 cc. of concentrated sulfuric acid and shaking the mixture for twenty-four hours. The resulting oil was treated with 50 cc. of water, shaken twenty-four hours and then washed three times with 200 cc. portions of water. The oil was then dried and finally shaken over night with calcium carbonate and filtered. Ninety grams of this oil and 45.5 g. of triethylphosphite (0.36 mole) were added to a flask and heated for five and one-quarter hours. At the end of this time the temperature of the contents of the flask had reached 200° C. In all 9.7 g. of volatile product was collected in a liquid nitrogen trap during the heating. This material from the trap was distilled in a low temperature Podbielniak column (boiling point of —3° C. under 200 mm.) and was shown to be ethyl chloride by means of mass spectra data. The residue in the flask was placed under vacuum and warmed to 50° C. to remove any volatile components. The silicone oil left in the flask at the end of this devolatilization weighed 115 g. Chemical analysis of the oil showed it to contain 5.7% phosphorus.

The products of the present invention are valuable as lubricants and lubricant additives, especially where flame retardant properties are desired. These products are also useful as plasticizers for synthetic resins and as insecticides and as intermediates in the preparation of oils, resins, and elastomers, used as lubricants and coating materials.

What I claim as new and desire to secure by Letters Patent of the United States is:

1. An organosilicon compound containing at least one organophosphorus radical attached to silicon through a silicon-carbon linkage, said organophosphorus radical being selected from the class consisting of

—(CH₂)ₙP(O)(OR')(OR")
—(CH₂)ₙP(O)(R)(OR")

and —(CH₂)ₙP(O)(R)(R') radicals where R, R' and R" are monovalent hydrocarbon radicals and n is an integer equal to from 1 to 10, inclusive, said organosilicon compound being selected from the class consisting of an organosilane having all of its valences, other than the valence satisfied by said organophosphorus radical, satisfied with monovalent hydrocarbon radicals, and an organopolysiloxane having all of its valences, other than the valences satisfied by said organophosphorus radical and by siloxane linkages, satisfied by monovalent hydrocarbon radicals.

2. An organosilane having at least one of the valences of silicon satisfied by an organophosphorus radical with the remaining valences of silicon being satisfied by monovalent hydrocarbon radicals, said organophosphorus radical being selected from the class consisting of

—(CH₂)ₙP(O)(OR')(OR")
—(CH₂)ₙP(O)(R)(OR")

and —(CH₂)ₙP(O)(R)(R') radicals where R, R' and R" are monovalent hydrocarbon radicals and n is an integer equal to from 1 to 10, inclusive.

3. An organopolysiloxane containing at least one organophosphorus radical attached to silicon through a silicon-carbon linkage with the remaining valences of silicon, other than the valences which make up the siloxane chain, being satisfied by monovalent hydrocarbon radicals, said organophosphorus radical being selected from the class consisting of

—(CH₂)ₙP(O)(OR')(OR")
—(CH₂)ₙP(O)(R)(OR")

and —(CH₂)ₙP(O)(R)(R') radicals where R, R' and R" are monovalent hydrocarbon radicals and n is an integer equal to from 1 to 10, inclusive.

4. The product of claim 3 in which the monovalent hydrocarbon radicals attached to silicon are methyl radicals.

5. Diethyl trimethylsilylmethylphosphonate, (CH₃)₃SiCH₂P(O)(OC₂H₅)₂

6. Diethyl pentamethyldisiloxanylmethylphosphonate, (CH₃)₃SiOSi(CH₃)₂CH₂P(O)(OC₂H₅)₂.

7. Diethyl heptamethylcyclotetrasiloxanylmethylphosphonate,

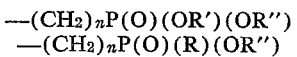

8. The process of making organosilicon compositions containing phosphorus attached to silicon through aliphatic carbon, which process comprises heating (1) a haloalkyl silicon compound selected from the class consisting of organosilanes containing at least one haloalkyl radical attached to silicon with the remaining valences of silicon being satisfied by monovalent hydrocarbon radicals and organopolysiloxanes containing at least one haloalkyl radical attached to silicon with the remaining valences of silicon other than the valences which make up the siloxane chain being satisfied by monovalent hydrocarbon radicals and (2) an ester of an acid of trivalent phosphorus.

9. The process of making organosilicon compositions containing phosphorus attached to silicon through aliphatic carbon, which process comprises heating (1) a haloalkyl silicon compound selected from the class consisting of organosilanes containing at least one haloalkyl radical attached to silicon with the remaining valences of silicon being satisfied by monovalent hydrocarbon radicals and organopolysiloxanes containing at least one haloalkyl radical attached to silicon with the remaining valences of silicon other than the valences which make up the siloxane chain being satisfied by monovalent hydrocarbon radicals and (2) an ester of an acid of trivalent phosphorus having a formula selected from the class consisting of P(OR)(OR')(OR"), RP(OR')(OR"), (R)(R')P(OR"), where R, R' and R" are members selected from the class consisting of alkyl radicals, aryl radicals, and aralkyl radicals.

10. The process of making an organosilane containing phosphorus attached to silicon through aliphatic carbon, which process comprises heating (1) an organosilane having the formula:

$(Z)_{4-m}Si[(CH_2)_nX]_m$ where Z represents members selected from the class consisting of alkyl radicals, aryl radicals, haloaryl radicals, aralkyl radicals, and mixtures of the aforesaid members; X is halogen, n is an integer equal to from 1 to 10, inclusive; and m is an integer equal to from 1 to 4, inclusive; and (2) an ester of an acid of trivalent phosphorus.

11. The process of making organopolysiloxanes containing phosphorus attached to silicon through aliphatic carbon, which process comprises heating (1) an organopolysiloxane having at least one haloalkyl radical attached to silicon, the remaining valences of silicon, other than the valences which make up the siloxane chain, being satisfied by members selected from the class consisting of alkyl radicals, aryl radicals, haloaryl radicals, aralkyl radicals and mixtures of the aforesaid members, and (2) an ester of an acid of trivalent phosphorus.

12. The process of making $$(CH_3)_3SiCH_2P(O)(OC_2H_5)_2$$

which process comprises heating chloromethyltrimethylsilane and triethyl phosphite.

13. The process of making $$(CH_3)_3SiOSi(CH_3)_2CH_2P(O)(OC_2H_5)_2$$

which process comprises heating chloromethylpentamethyldisiloxane and triethyl phosphite.

14. The process of making

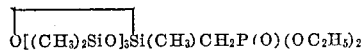

which process comprises heating chloromethylheptamethylcyclotetrasiloxane and triethyl phosphite.

15. The process of making a methyl silicone oil containing phosphorus attached to silicon through aliphatic carbon, which process comprises heating (1) a methyl silicone oil containing at least one chloromethyl radical attached to silicon and (2) triethyl phosphite.

References Cited in the file of this patent

UNITED STATES PATENTS 2,673,210    Frisch _____ Mar. 23, 1954

OTHER REFERENCES

Malatesta: "Gazz. Chem. Ital.," vol. 80 (1950), pages 527–532.